INVENTOR.
JOHN B. BREAZEALE

United States Patent Office 2,907,990
Patented Oct. 6, 1959

2,907,990

INTEGRATING DEVICE

John B. Breazeale, Solana Beach, Calif., assignor to Bill Jack Scientific Instrument Co., Solana Beach, Calif., a corporation of California Application April 16, 1956, Serial No. 578,512

5 Claims. (Cl. 340—178)

The present invention relates to computing devices and, more particularly, to a method and device for integrating a function which varies with time and which is represented by a current or voltage signal.

An important object of the present invention is to provide a new and improved high precision integrating device for obtaining the integral of a current or voltage input signal with respect to time, and which responds rapidly to changes in the input signal.

Another object is to provide a new and improved high precision integrating device from which both first and second integrals with respect to time of an input electrical signal can be obtained.

A further object of the present invention is to provide a new and improved integrating device for obtaining an integral of an electrical signal, which device is capable of performing the integrating function regardless of the polarity or the changes in polarity of the input signal.

Yet another object of the present invention is to provide a new and improved integrating device in which the input signal to be integrated energizes the field coils of a torquer for applying a torque to a rotor which is proportional to the input signal and in which the angular velocity of the rotor is measured to determine the first integral and the total angular rotation is measured to obtain the second integral of the input signal with respect to time.

A further object of the present invention is to provide a new and improved integrating device in which the angular velocity of a rotor is indicative of the first integral of the input signal with respect to time and wherein the torque applied to the rotor is proportional to the magnitude of the input signal.

Figure 1:
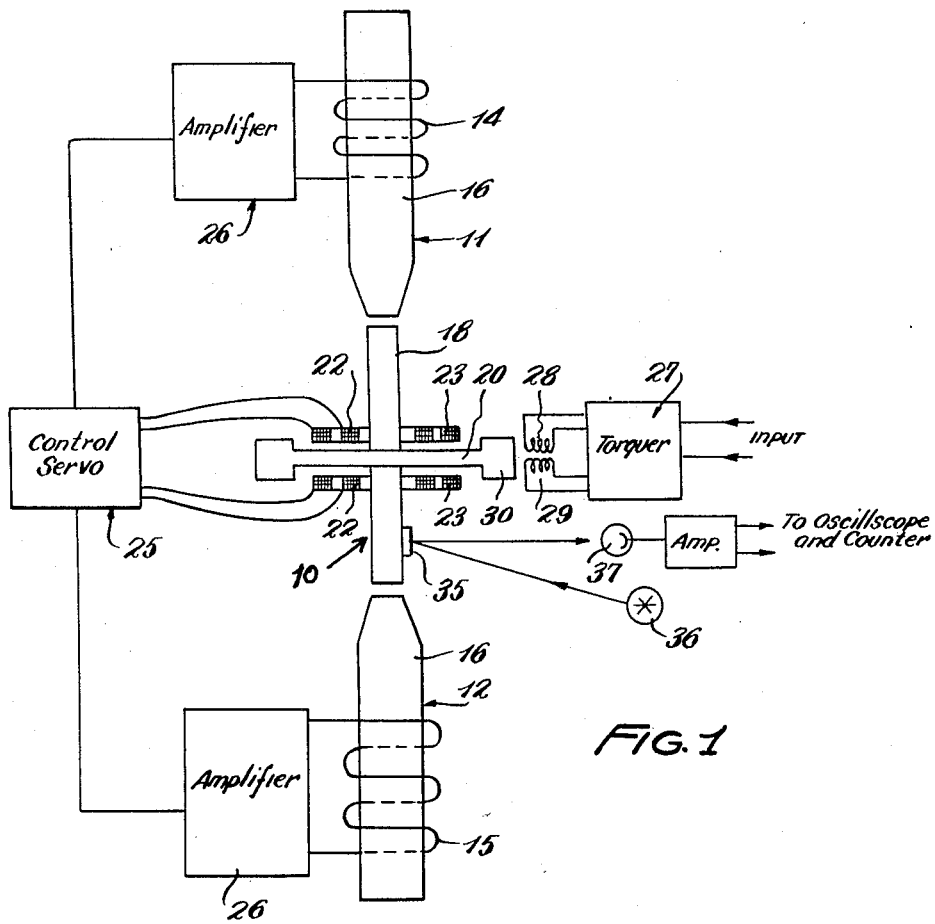
Figure 2:
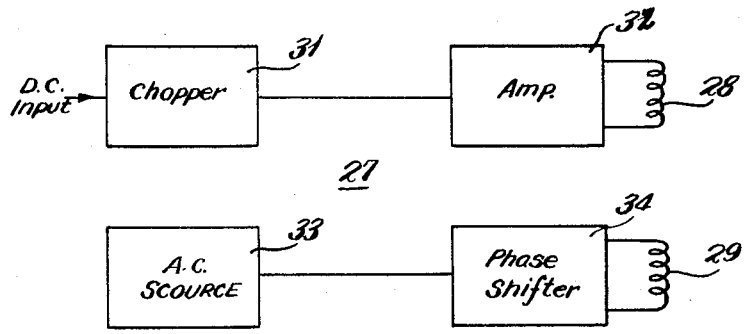

Further objects and advantages of the present invention will be apparent from the following description of the preferred embodiment made with reference to the accompanying drawings, the disclosure of which, including all constructions and arrangements shown therein, and the advantages apparent therefrom and inherent therein, whether or not expressly described hereinafter, forms a part of this specification and description of the preferred embodiment, and wherein:

Figure 1 is a view, chiefly diagrammatic, showing an integrating device embodying the present invention; and Figure 2 is a block circuit diagram showing the components of the torquer of the device of Figure 1.

The present invention contemplates the provision of a novel integrating device wherein a rotor has a torque applied thereto which is proportional to an input signal to be integrated with respect to time and wherein the angular velocity and the total angle of rotation of the rotor provide an indication of the first and second integrals respectively, the rotor preferably being magnetically suspended so as to minimize the errors due to friction.

Referring to the drawings, the preferred embodiment shown therein comprises a rotor 10 magnetically suspended between electromagnets 11, 12. The electromagnets 11, 12 are comprised of electric coils 14, 15, respectively, wound on spaced coaxial cylindrical cores 16.

The rotor 10 includes a cylindrical member 18 coaxial with the cores 16 and a disc 20 fixed to the cylindrical member 18 and coaxial therewith. Preferably the disc 20 is at approximately the midpoint of the length of the member 18. To maintain the rotor 10 in a predetermined axial position between the electromagnets 11, 12 a pair of coaxial and coplanar sensing coils 22, 23 is provided on each side of the disc 20, the coils lying in planes parallel to and coaxial with the disc. The coils 23 are exciting coils and respectively induce currents in the coplanar coils 22, the induced currents in the coils 22 depending on the position of the disc 20 relative to the coils. If the disc shifts axially from its normal center position between the pairs of coils on the opposite sides thereof, the induced current in one of the coils 22 will increase while the induced current in the other coil 22 will decrease. The coils 22 are connected to a control servomechanism 25 for controlling the currents flowing in the coils 14, 15 of the electromagnets in accordance with the induced currents in the coils 22. The control servomechanism 25 is responsive to the currents induced in the coils 22 to reduce the energization of the electromagnet toward which the disc 20 moves and to increase the energization of the other electromagnet. The particular construction of the servo-mechanism does not, per se, form a part of this invention and therefore has not been shown or described in detail. Suitable servo-mechanisms are well known to those skilled in the art and a servo-mechanism similar to that shown and described in co-pending application Serial No. 544,954, now Patent No. 2,838,974, filed November 4, 1955, by myself and others as joint inventors, is suitable for use with the present invention. Amplifiers 26 are preferably provided between the servo-mechanism and each electromagnet 11, 12.

The rotor 10 is rotated by means of a torquer 27 having field coils 28, 29 inductively coupled with an annular member 30 carried by the outer periphery of the disc 20. Energization of the field coils 28, 29 creates a torque tending to rotate the rotor 10. The electrical signal to be integrated is applied to the input of the torquer and the torque applied to the rotor 10 is proportional to the magnitude of the input signal.

Torquers suitable for use with the present invention are known to those skilled in the art. If desired a torquer of the type shown in Figure 2 may be utilized. In the torquer of Figure 2, the direct current input which is to be integrated is connected to the field coil 28 through a chopper 31 for periodically interrupting the direct current input signal, the output of the chopper being amplified by an alternating current amplifier 32. The chopper 31 has the same frequency as, and operates in phase with, an alternating current source 33 for energizing the field coil 29. The alternating source 33 is connected to the field coil 29 through a phase shifting circuit 34 so that the currents in the torquer coils are 90° out of phase with each other. Since the torque applied to the rotor 10 is the product of the currents in the field coils 28, 29 and since the current in field coil 29 is constant and that in field coil 28 proportional to the input signal, the torque applied to the rotor is proportional to the input signal.

When a torque is applied to the rotor 10, the motion of rotor 10 may be described by the following differential equation:

$$T = I \frac{d^2\theta}{dt^2}$$

where T is the torque applied to the rotor, I is the moment of inertia of the rotor about its axis, and $\theta$ is the angle through which the rotor has turned. Since the torque is directly proportional to the voltage of the input signal the above equation may be written as:

$$\frac{d^2\theta}{dt^2} = \frac{K}{I} V$$

where V is the input voltage. K is a proportionality constant dependent on the geometry and construction of the torquer and rotor. This constant K may be defined as the torque, in dyne-cm., produced on the rotor by the application of one volt to the input terminals of the torquer 27. Taking the first integral $$\frac{d\theta}{dt} = \frac{K}{I}\int V dt$$

Since $$\frac{d\theta}{dt}$$

is equal to the angular velocity it is apparent that the first integral of V with respect to time may be obtained by measuring the frequency of rotation of the rotor. Taking the second integral, with respect to time, it can be seen that $$\frac{I}{K}\theta = \int\left(\int V dt\right)dt$$

and that the second integral of V with respect to time can be obtained by measuring the total angle of rotation of the rotor 10.

The cylindrical member 18 of the rotor 10 carries a mirror 35, and a light source or lamp 36 has its rays directed so as to be reflected by the mirror into a photoelectric cell 37 when the mirror is in a predetermined position during its rotational movement. Each flash of light creates an electrical pulse so that the angular velocity of the rotor 10 may be obtained by measuring the frequency of the pulses and the total angular rotation obtained by counting the pulses. For measuring the angular velocity and total angular movement of the rotor 10, the output of the photoelectric cell is amplified and connected to an oscilloscope and pulse counter respectively.

The magnetically suspended rotor is preferably suspended within a vacuum enclosure, not shown in the drawings.

While the rotor 10 has been described as, and preferably is, magnetically suspended, certain features of the invention are applicable to non-magnetically suspended rotors. Additionally, other means than that described may be provided for measuring the angle velocity and total angular movement of the rotor.

It can now be seen that the present invention provides a new and improved, high precision integrating device preferably operable to obtain first and second integrals of an input signal and while the preferred embodiment thereof has been described in detail, it is my intention to cover all modifications and constructions and arrangements which fall within the ability of those skilled in the art and the scope of the appended claims.

What I claim is:

1. A device for obtaining the integral of an electrical input signal comprising a rotor, means for magnetically suspending said rotor including spaced electromagnets and control means responsive to changes in axial position of said rotor for controlling the energization of said electromagnets to maintain the rotor in a predetermined position in space free from friction, a single means for imparting a torque to said rotor proportional to the magnitude of the input signal, and means for measuring the angular velocity of said rotor.

2. A device for obtaining the integral of an electrical input signal comprising a rotor, means for magnetically suspending said rotor including spaced electromagnets and control means responsive to changes in axial position of said rotor for controlling the energization of said electromagnets to maintain the rotor in a predetermined position in space free from friction, a single means for imparting a torque to said rotor proportional to the magnitude of the input signal, and means for measuring the angular velocity and total angle of rotation of said rotor.

3. A device for obtaining the integral of an electrical input signal comprising a rotor, means for magnetically suspending said rotor including spaced electromagnets and control means responsive to changes in axial position of said rotor for controlling the energization of said electromagnets to maintain the rotor in a predetermined position in space free from friction, a single means for imparting a torque to said rotor proportional to the magnitude of the input signal, means for measuring the angular velocity of said rotor comprising a reflecting surface rotatable with said rotor, means for directing light on said surface at it moves through a predetermined position to produce a reflection, and photoelectric means responsive to said reflection.

4. A device for obtaining the integral of an electrical input signal comprising a rotor, means for magnetically suspending said rotor including spaced electromagnets and control means responsive to changes in axial position of said rotor for controlling the energization of said electromagnets to maintain the rotor in a predetermined position in space free from friction, a single means for imparting a torque to said rotor proportional to the magnitude of the input signal, means for measuring the angular velocity and total angle of rotation of said rotor comprising a reflecting surface rotatable with said rotor, means for directing light on said surface as it moves through a predetermined position to produce a reflection, and photoelectric means responsive to said reflection.

5. In a device for obtaining first and second integrals of an electrical input signal, first and second spaced coaxial electromagnets, a cylinder rotor member coaxial with said electromagnets and magnetically suspended in space thereby, a disc carried by and coaxial with said rotor, means responsive to axial movements of said disc for controlling the energization of said electromagnets to maintain said disc and rotor member in a predetermined axial position, a single torque producing means responsive to an electrical input signal for applying a torque to said rotor which torque is proportional to the input signal, a reflecting surface carried by said rotor, means for directing light rays on said surface as it passes through a predetermined position to produce a reflection, and photoelectric means responsive to said reflection to measure the angular velocity and total angular rotation of said rotor.

References Cited in the file of this patent

UNITED STATES PATENTS

| | | |
|---|---|---|
| 1,721,375 | DeKonig | July 16, 1929 |
| 1,857,593 | Hill | May 10, 1932 |
| 2,007,220 | Smith | July 9, 1935 |
| 2,398,238 | McNatt | Apr. 9, 1946 |
| 2,485,888 | Jordan | Oct. 25, 1949 |
| 2,513,537 | Williams | July 4, 1950 |
| 2,566,221 | Lovell | Aug. 28, 1951 |
| 2,602,837 | Foster | July 8, 1952 |
| 2,691,306 | Beams | Oct. 12, 1954 |